United States Patent [19]

Goll

[11] 4,016,530

[45] Apr. 5, 1977

[54] BROADBAND ELECTROACOUSTIC CONVERTER

[76] Inventor: Jeffrey H. Goll, 500 W. University Parkway, Apt. 6B, Baltimore, Md. 21210

[22] Filed: June 2, 1975

[21] Appl. No.: 582,763

[52] U.S. Cl. .................................. 340/15; 310/8.2; 340/8 MM; 181/402

[51] Int. Cl.[2] .......................................... H04B 11/00

[58] Field of Search .............. 340/8 MM, 15, 5 MP; 310/8.1, 8.2; 181/402

[56] References Cited

UNITED STATES PATENTS 3,872,332 3/1975 Butter ........................... 340/8 MM

OTHER PUBLICATIONS

P. J. Highmore, in Ultrasonics International 1973 Conference Proceedings, Science & Technology Press, Guifford, U. K. 1973, pp. 112–118.

*Primary Examiner*—Maynard R. Wilbur
*Assistant Examiner*—T. M. Blum
*Attorney, Agent, or Firm*—Pennie & Edmonds

[57] ABSTRACT

A broadband electroacoustic converter incorporating a two-layer acoustic coupler is disclosed for efficiently converting between electrical signals carried on an electrical network having a specified electrical impedance and acoustic signals carried in a load medium having a specified acoustic impedance.

13 Claims, 4 Drawing Figures

BROADBAND ELECTROACOUSTIC CONVERTER

FIELD OF THE INVENTION

The present invention relates to an efficient, broadband electroacoustic converter for converting between electrical and acoustical signals.

BACKGROUND OF THE INVENTION

Piezoelectric transducers are widely used to convert between electrical and acoustical signals. If a single voltage is applied across opposite sides of a thin disk of piezoelectric material, the dimensions of the disk will vary with the voltage thereby generating an acoustic signal. Conversely if acoustic waves impinge upon the disk, it will be mechanically deformed and a voltage will appear across the two sides.

A problem which has plagued the use of piezoelectric transducers for many applications is that the efficiency of transduction between electrical and acoustical signals depends strongly on the frequency of the exciting signal, be it electric or acoustic. This effect is particularly pronounced when the exciting frequency approaches a mechanical resonance frequency of the transducer. For applications involving short ultrasonic pulses such as acoustic imaging and sonar the problem of the narrow bandwidth of piezoelectric transducers is particularly troublesome since for an electroacoustic converter to avoid distorting pulses it must have a constant conversion efficiency and linear phase transfer relation over a relatively wide frequency range.

Several techniques have been employed to permit the use of thin-disk piezoelectric transducers in applications requiring broadband electroacoustic converters. One technique involves attaching a sound-absorbing backing on the transducer, as disclosed in Kossoff, *IEEE Transactions on Sonics and Ultrasonics*, Vol. SU-13, pp. 20–30(March, 1966) and in Merkulov and Yablonik, *Soviet Physics-Acoustics*, Vol. 9, pp. 365–372(April–June, 1964). While damping the transducer with a sound-absorbant backing does broaden its bandwidth, the conversion efficiency of the transducer is greatly reduced since the backing must absorb a large proportion of the acoustic signal. This is a serious drawback in many applications, particularly those involving the detection of weak acoustic signals. Furthermore the backing increases the physical size of the transducer making it too bulky for some applications.

A second technique for increasing the bandwidth involves inserting a layer of material between the transducer and the acoustic medium with which the transducer is to communicate, as disclosed in the Kossoff reference cited above. The thickness and acoustic impedance of the material are selected to transform the acoustic impedance of the transducer material to that of the medium. This impedance matching may be accomplished at a selected frequency if the acoustic impedance of the matching layer equals the square root of the product of the impedances of the transducer and the load medium and if the thickness of the matching layer equals the acoustic quarter wavelength at the selected frequency in the material of which the matching layer is composed. Although such matching layers increase the bandwidth of the transducer to a limited extent, materials which have the proper acoustic impedance are not readily available to impedance match some important classes of transducers and load media. One widely-used group of piezoelectric transducers have acoustic impedances in the range of from about $30 \times 10^6$ to about $36 \times 10^6$ kg/s m$^2$. Examples of such materials are lithium niobate and the lead zirconate-titanate ceramics currently marketed by the Vernitron Corporation of 232 Forbes Road, Bedford, Ohio, under the trade names "PZT-4," "PZT-5A," "PZT-5H" and "PZT-7A." Physical constants characterizing these four "PZT" ceramics are set forth in Table I on page 21 of the article by Kossoff cited above, which table is incorporated herein by reference for purposes of identifying the "PZT" ceramics. If a transducer of one of these materials is to be impedance matched with a single quarter-wave layer to a water medium, which has an acoustic impedance of about $1.5 \times 10^6$ kg/s m$^2$, a material having an acoustic impedance of roughly $7 \times 10^6$ kg/s m$^2$ is required. Materials of this impedance, however, are not readily available and must be specially synthesized for this application. Furthermore the bandwidth achieved with an electroacoustic converter made from a piezoelectric transducer and a single quarter-wave matching layer, although greater than the bandwidth of the transducer along radiating into a water load, may not be broad enough for many applications involving short acoustic pulses.

Electroacoustic converters employing double-layer acoustic couplers have been reported, but these devices failed to exhibit sufficiently broad bandwidth or low insertion loss for many applications. One reference; Dianov, *Soviet Physics-Acoustics*, Vol. 5, pp. 30–35(1959); discloses the insertion of a layer of water and a glass plate between a quartz transducer and a water load, the thickness of the glass plate being half the wave thickness of the quartz transducer and the thickness of the water layer being variable. The author noted that the presence of the layers led "to a marked reduction in the transmission band." U.S. Pat. No. 2,430,013 discloses an electroacoustic converter for use with water loads which employs a quartz transducer and a broadband double-layer acoustic coupler. As discussed below, because of the high radiation Q of acoustically-matched quartz transducers, the insertion loss of broadband quartz converters is generally too high for many applications. In the Kossoff article cited above, it is stated that, "it was experimentally confirmed that the response [of a piezoelectric ceramic transducer] was degraded when a double matching layer consisting of an outer $\lambda/4$ [quarter-wave] araldite layer on the $\lambda/4$ matching aluminum araldite layer was employed." None of these references in any way discloses or suggests the novel electroacoustic converter as disclosed and claimed herein.

SUMMARY OF THE INVENTION

The present invention relates to a novel electroacoustic converter for efficiently converting between electrical and acoustical signals over a wide frequency range. The present invention may be used to particular advantage with a low-impedance medium such as water or the human body.

The electroacoustic converter of the present invention comprises a thin-plate piezoelectric transducer adjoining and in acoustic contact with a double-layer acoustic coupler. The transducer is preferably operated in a thickness mode and is preferably composed of a material having a relatively high thickness-mode electromechanical coupling constant $k_t$ such as lithium niobate and the lead zirconate-titanates PZT-4, PZT-5A, PZT-5H, and PZT-7A. The transducer preferably has a half-wave resonance frequency approximately equal to a center frequency characterizing a frequency range in which the signals of interest lie. The half-wave resonance frequency and the lateral dimensions of the transducer generally influence the bandshape and insertion loss of converters of the present invention. Criteria are given below for selecting these parameters to obtain preferred embodiments having highly symmetric bandshapes and low insertion losses. The lateral dimensions of a transducer of the present invention is preferably substantially greater than its thickness in order to minimize acoustic diffraction effects and coupling to shear modes.

The acoustic coupler of the present invention comprises two layers of materials adjoining one another and in acoustic contact so that acoustic signals may pass from one layer to the other. The thickness of the layers may approximately equal an odd multiple of the acoustic quarter-wave length in the material of which the layer is composed at the center frequency of the range of frequencies of interest. As described in detail below it is preferred to make the layers a single quarter-wave length thick. The lateral dimensions of a layer is preferably substantially greater than its thickness.

When an electroacoustic converter of the present invention is to be used with water loads and employs a piezoelectric transducer composed of a material having an acoustic impedance in the range of from about $30 \times 10^6$ to $36 \times 10^6$ kg/m s$^2$, the two layers of the acoustic coupler respectively are preferably composed of a material having an acoustic impedance of about $13 \times 10^6$ kg/s m$^2$, such as quartz or glass, and a material having an acoustic impedance of about $3 \times 10^6$ kg/s m$^2$, such as an acrylic plastic. These materials are readily available, inexpensive, and easily fabricated into the double-layer coupler of the present invention. The layer having the greater acoustic impedance is placed in acoustic contact with the transducer and the other layer in contact with the load.

Other embodiments of the present invention further comprise an electrical circuit for matching the electrical impedance of the transducer to the impedance of an electrical network to which it is connected. This network may be an electrical device such as a signal generator or receiver amplifier, which often have electrical impedances of 50 ohms.

An advantage of electroacoustic converters of the present invention is that they have a relatively broad bandwidth and thus may be used in applications such as acoustic imaging and sonar which require short acoustic pulses.

A second advantage of the present invention is that the phase response is relatively linear over a broad frequency range and thus pulsed signals may be handled without significant distortion.

A further advantage of electroacoustic converters of the present invention is that the conversion may be carried out efficiently over a broad frequency range. These converters may therefore be used to advantage to detect weak acoustical signals.

A further advantage of converters of the present invention is that they may readily be adapted for use with electrical signal processing devices having electrical impedances of 50 ohms.

An additional advantage of converters of the present invention is that they may be used to generate or receive efficiently acoustical signals in water loads or in human tissue.

A further advantage of converters of the present invention is that they may employ acoustic couplers fabricated from inexpensive and readily available materials such as fused quartz or glass and acrylic plastics.

BRIEF DESCRIPTION OF THE DRAWINGS

Preferred embodiments of the invention are described below with reference to the following drawings.

Like reference numerals designate like parts in the several views.

DETAILED DESCRIPTION OF THE DRAWINGS

Figure 1:
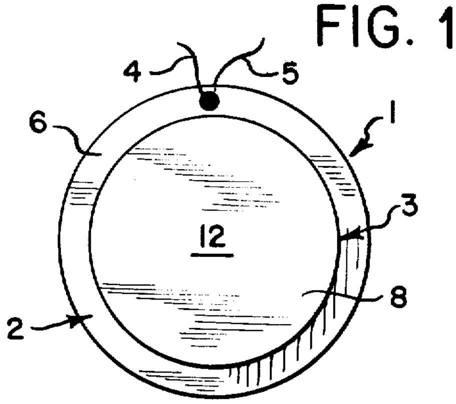
FIG. 1 is a front view of an electroacoustic converter of the present invention.

Referring now to FIG. 1, electroacoustic converter 1 comprises piezoelectric converter 2 connected to acoustic coupler 3. Transducer 2 is preferably composed of a material having a thickness-mode electromechanical coupling constant $k_t$ of greater than 0.3. Examples of suitable transducer materials are lithium niobate and lead zirconate-titanate ceramics such as PZT-5A. Transducer 2 is shaped as a thin disc, the dimensions of which are described in detail below. Electrical leads 4 and 5 are connected to metallic electrodes 6 and 7 respectively. Electrode 7 is not visible in FIG. 1. The two electrodes are deposited on opposing faces of transducer 1.

Acoustic coupler 3 is also shaped as a disc. Face 8 of coupler 3 forms an acoustic port through which acoustic signals may pass between the coupler and a load medium with which port 8 is in acoustic contact.

Figure 2:
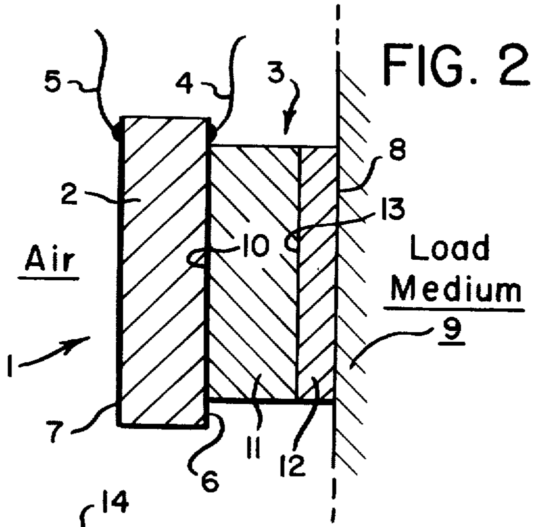
FIG. 2 is a cross-sectional view of the converter of FIG. 1 showing the converter adjoining a load medium.

FIG. 2 depicts electroacoustic converter 1 in cross-section and adjoining a load medium 9. Transducer 2 adjoins and makes acoustic contact with acoustic coupler 3 at face 10 of coupler 3 which forms an acoustical port through which acoustic signals may pass between the coupler and the transducer.

Coupler 3 may be attached to transducer 2 by means of a thin film of a suitable bonding agent such as phenyl salicylate, phenyl benzoate, or epoxy adhesive. For example, transducer 2 and coupler 3 may be warmed to greater than about 43° C and a small amount of phenyl salicylate, which melts at 43° C, spread over the face 9 of the coupler to form a thin layer of liquid. The transducer and coupler may then be pressed together and allowed to cool to room temperature so that the phenyl salicylate recrystallizes, bonding the coupler and transducer together so that the two are in acoustic contact. The thin film of bonding agent and metallic electrode 6, both of which are interposed between the piezoelectric material out of which transducer 2 is composed and face 10 of coupler 3, are preferably made much thinner than acoustic quarter-wave lengths in the metal and bonding agent at the frequencies of interest in order to minimize the effect of these materials on the performance of converter 1. At very high frequencies, for example in the microwave range, the acoustic quarter-wave lengths may be so short that it becomes difficult to make the electrode and film of bonding agent sufficiently thin for them to have a negligible effect.

Acoustic coupler 3 adjoins and makes acoustic contact with load medium 9 at face 8. In the case of a fluid load medium such as water, acoustic contact may be established simply by immersing face 8 in the fluid.

Acoustic coupler 3 is fabricated from two discs 11 and 12. Disc 11 is preferably composed of fused quartz or glass and disc 12 from an acrylic plastic such as the material currently marketed by E. I. duPont de Nemours and Company of Wilmington, Delaware, under the tradename "Lucite." The face of disc 11 opposing face 10 and the face of disc 12 opposing face 8 adjoin one another forming an interface 13 between the two discs at which the discs are in acoustic contact. The two discs may be attached to one another at interface 13 by means of a thin film of an adhesive such as epoxy. As explained in connection with attaching coupler 3 to transducer 2, the film of adhesive at interface 13 is preferably much thinner than an acoustic quarter-wave length in the adhesive at the frequencies of interest. The dimensions of discs 11 and 12 are discussed in detail below.

Figure 3:
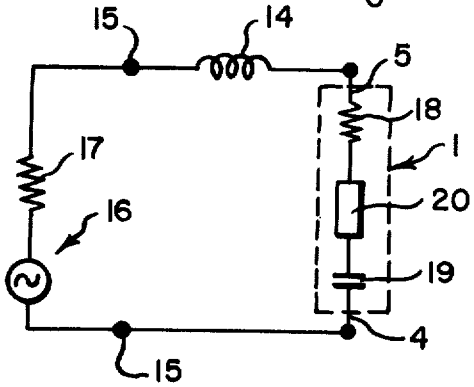
FIG. 3 is a diagram of an electrical circuit incorporating an electroacoustic converter of the present invention.

In FIG. 3 a circuit incorporating electroacoustic converter 1 is diagrammed. Lead 5 of transducer 2 is connected to inductor 14; lead 4 and inductor 14 are connected to terminals 15 which form an electrical port through which electrical signals may pass. Also connected to terminals 15 is a signal source 16 characterized by an output impedance shown as resistor 17. Signal sources having output impedances of 50 ohms are in wide use, although other values of output impedances are used for some applications. Converter 1 has an effective electrical impedance which may be represented at a particular frequency by capacitor 19 and a "radiation impedance" consisting of resistive and reactive components symbolized by resistor 18 and reactance element 20 all in series with leads 4 and 5. The electrical impedance of converter 1 is influenced by a number of factors including the shape, dimensions and acoustic loading of transducer 1. As will be explained below, in preferred embodiments of the present invention the resistive component of this electrical impedance approximately equals the output impedance of signal source 16 and the net reactive component is no more than about 10 times greater than the resistive component in magnitude. The value of inductor 14 is preferably selected to optimize the bandshape of the converter.

Figure 4:
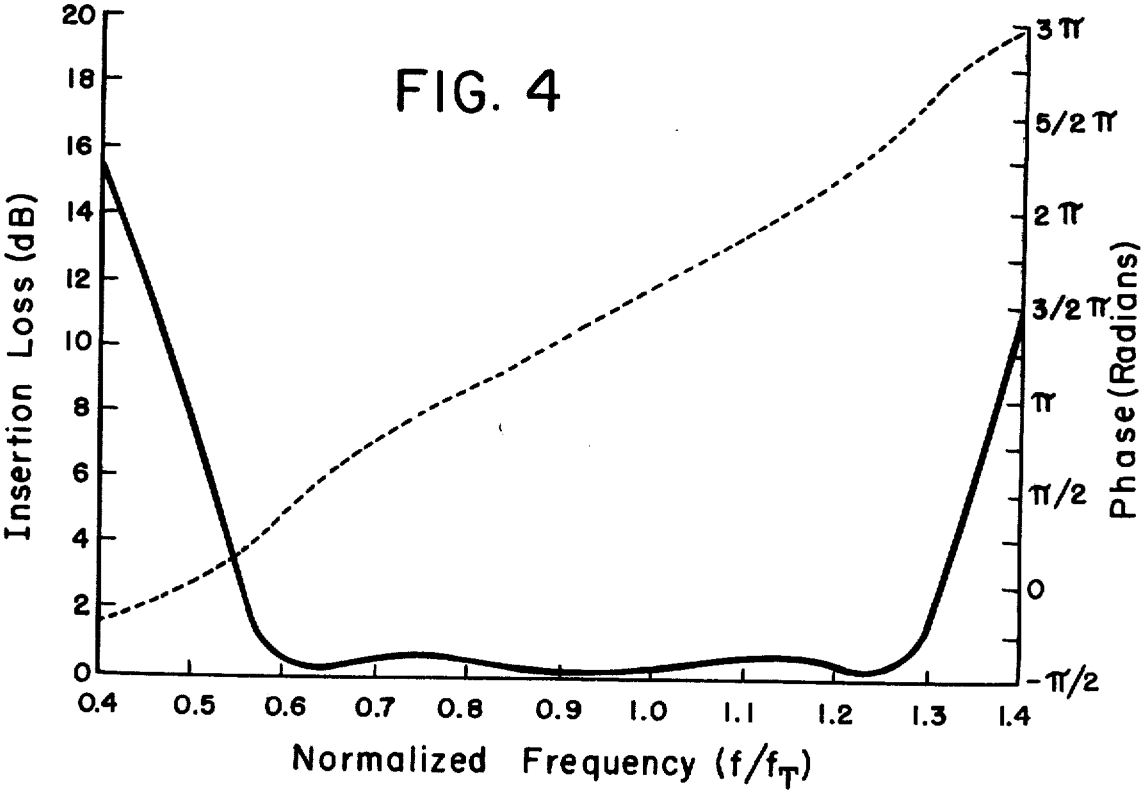
FIG. 4 is a graph showing the insertion loss (solid line and phase transfer relation (dashed line) of an electroacoustic converter of the present invention as a function of the normalized frequency.

FIG. 4 presents a graph which illustrates the extremely broad bandwidth and low insertion loss which may be obtained with an elastroacoustic converter of the present invention. For this embodiment the 3 dB bandwidth is calculated to be in excess of 75% and to be constant to within 1 dB over a 70% bandwidth. In contrast, a converter employing a single quarter-wave layer for acoustic impedance matching was calculated to be constant to within 1 dB only over a 45% bandwidth. FIG. 4 represents the response of an electroacoustic converter of the type depicted generally in FIGS. 1 and 2 operating into a water load and connected in series with an 8 $\mu$H inductor and a signal generator having a 50 ohm resistance as shown in FIG. 3. The piezoelectric transducer is composed of the lead zirconate-titanate ceramic PZT-5A and is half-wave resonant at 1.55 MHz. The two-layer acoustic coupler employs discs of fused quartz and Lucite, each approximately a quarter-wave thick at 1.43 MHz. Further details concerning this particular embodiment are given in the following section. The abscissa of FIG. 4 is normalized with respect to the half-wave resonance frequency 1.55 MHz.

The insertion loss, IL, plotted in FIG. 4 is expressed in dB and is defined by the following formula:

$$IL = 10 \log (P_o/P_a),$$

where $P_o$ is the power delivered by an electrical signal source when operating into a matched load and $P_a$ is the actual power delivered by the signal source when connected to the converter. In embodiments of electroacoustic converters of the present invention in which the piezoelectric transducers are not backed with a sound absorbant material, the power actually delivered by the signal source approximately equals the power delivered to the acoustic load.

The phase graphed in FIG. 4 refers to the phase of an acoustic signal at an acoustical port of an electroacoustic converter determined relative to the phase of a sinusoidal electrical signal at an electrical port.

BASIC PARAMETERS OF THE INVENTION

The narrow bandwidth of piezoelectric transducers in contact with water is in part a consequence of the mismatch of acoustic impedances between the transducer and the load. Thus it is generally possible to increase the bandwidth by coupling the transducer to the load by an acoustic coupler which reduces or eliminates the impedance mismatch over a particular frequency range.

The acoustic impedance for a particular frequency observed at one face of a double-layer acoustic coupler is directly proportional to the impedance of the load medium with which the second face is in contact when the thickness of each layer equals the acoustic quarter-wave length or an odd multiple thereof at the particular frequency in the material of which the layer is composed and the lateral dimensions of each layer is substantially greater than its thickness. In this case the proportionality constant is given by the square of the ratio of the acoustic impedances of the materials of which the two layers are composed, the impedance of the layer adjoining the load medium being in the denominator. The impedance mismatch between two different media may be reduced by such a double-layer coupler if the square of the ratio of the acoustic impedances of the materials of which the two layers are composed aproximately equals the ratio of the acoustic impedances of the two media. Embodiments of the present invention employing quarter-wave discs of fused quartz and Lucite have proportionality constants of about 17.0, so that a water load with an acoustic impedance of about $1.5 \times 10^6$ kg/s m$^2$ may be transformed to an impedance of about $25.6 \times 10^6$ kg/s m$^2$. Thus the impedance mismatch between a water load and piezoelectric transducers having acoustic impedances in the range between about 30 and $36 \times 10^6$ kg/s m$^2$ may be substantially reduced.

A criterion is known for optimizing the bandwidth of double-layer quarter-wave couplers for transmitting acoustic signals between two media having acoustic impedances of $Z_a$ and $Z_b$. To achieve a broad acoustic bandwidth the quarter-wave layer adjoining the medium of acoustic impedance $Z_a$ preferably is composed of a material having an acoustic impedance given by $(Z_a^3\ Z_b)^{1/4}$ and the quarter-wave layer adjoining the medium of acoustic impedance $Z_b$ is composed of a material having an acoustic impedance given by $(Z_a\ Z_b^3)^{1/4}$. In preferred embodiments of the present invention, the impedances of the layers in the double-layer acoustic couplers approximately satisfy these two relations.

Dimensions of the various parts making up preferred embodiments of the present invention for use over a frequency range centered about a given center frequency $f_o$ may be found according to the following considerations.

The thickness of each layer making up acoustic couplers employed in preferred embodiments of the present invention is preferably approximately equal to an odd multiple of the acoustic quarter-wave length at the frequency $f_o$ in the material of which the disc is composed. In order to minimize signal losses and to maximize the bandwidth it is advantageous to make the layers a single quarter-wave length thick. At high frequencies, however, plates only a single quarter-wavelength thick may be so thin as to be fragile and difficult to fabricate, in which case it may be preferable to employ layers whose thickness is an odd multiple greater than one of the quarter-wave length.

Acoustic couplers in embodiments of the present invention are not limited to circular plates (discs), since plates of rectangular or other shape may be used to similar advantage if convenient for the particular application in which the coupler is to be used. The lateral dimensions of the plates are substantially greater than the thickness in preferred embodiments in order to minimize diffraction effects and coupling to other acoustic modes. The faces of the plates are preferably planar and substantially parallel.

The thickness of a thin-plate piezoelectric transducer is generally specified by specifying its half-wave resonance frequency. In preferred embodiments of the present invention the thickness of the piezoelectric transducer is chosen so that the half-wave resonance frequency approximately equals the center frequency $f_o$. It has been found that converters of the present invention generally have particularly symmetric band shapes when the half-wave resonance frequency approximately equals 1.09 times $f_o$.

The lateral dimensions of a piezoelectric transducer is generally specified in terms of its active area, which approximately equals the area defined by the electrodes. In preferred embodiments of the present invention, the active area A approximately equals the following formula:

$$A \approx \frac{k_t^2\, v_t}{\pi^2\, \epsilon_t\, f_t^2\, R_e\, r}$$

where $R_e$ is the electrical impedance of the network to which the converter is connected, $f_t$ is the half-wave resonance frequency of the transducer, $k_t$ is the thickness-mode electromechanical coupling constant of the piezoelectric material, $v_t$ is the acoustic phase velocity in the material along the thickness axis, $\epsilon_t$ is the clamped dielectric constant of the material along the thickness axis, and $r$ is the ratio of the acoustic load impedance as transformed by the acoustic coupler at the center frequency $f_o$ to the acoustic impedance of the transducer material. This formula implies that the preferred active area is directly proportional to the square of the wavelength of the half-wave resonance frequency in the material. Thus once the preferred active area has been determined for a particular piezoelectric material, network impedance, transformed load impedance and frequency; the preferred active areas for other frequencies may be determined readily. For the case of active areas which are circular, the preferred diameter for a given material and network impedance equals a constant number of wavelengths in the material. The following table lists preferred diameters for several piezoelectric materials assuming a network impedance of 50 ohms and a transformed load impedance of $25.6 \times 10^6$ kg/s m$^2$.

| Material | Diameter in Wavelengths |
|---|---|
| lithium niobate | 18 |
| "PZT-4" | 6 |
| "PZT-5A" | 5 |
| "PZT-5H" | 4 |
| "PZT-7A" | 9 |

If the active area is selected according to the formula in the preceding paragraph, the resistive component of the input impedance of the converter when acoustically loaded will approximately equal the impedance $R_e$ of the electrical network to which the converter is to be connected for frequencies in the vicinity of the half-wave resonance frequency.

Not all piezoelectric materials are equally suited for electroacoustic converters of the present invention. For example, the value of the thickness-mode coupling constant $k_t$ must be considered in selecting a piezoelectric material since this parameter strongly influences the insertion loss of electroacoustic converters employing piezoelectric transducers. Even if a transducer is acoustically matched to a load medium over a broad frequency range with an acoustic coupler, the insertion loss may be too high for many applications if the radiation Q of the transducer, which depends on $k_t$, is high. It may be possible to use a complex electrical impedance-matching circuit to reduce the insertion loss of such a high-Q transducer, but the reduction is generally limited unless accomplished at the expense of reducing the bandwidth. In preferred embodiments of the present invention the radiation Q of the transducer is low, making it possible to achieve broad bandwidth and low insertion loss simultaneously. The radiation Q of an acoustically loaded piezoelectric transducer is defined by the formula $$Q = \frac{\pi}{4}\ \frac{r}{k_t^2},$$

where $r$ is the ratio of transformed load impedance to transducer impedance defined above. In preferred embodiments of the invention, the radiation Q is less than about 10, which implies that the coupling constant $k_t$ of the material should be greater than about 0.3. Quartz has a radiation Q of about 90 when acoustically matched, which is to high for many applications requiring broad bandwidth and low insertion loss.

Converters of the present invention employing no electrical impedance-matching circuitry whatsoever have been calculated to have 3 dB bandwidths in excess of 70% and a minimum insertion loss of just over 2 dB in a 50 ohm circuit. The addition of a single inductor in series with an electrode of the transducer may improve the symmetry of the band shape as well as significantly decrease the ripple and reduce the insertion loss.

Because of their high dielectric constants, piezoelectric ceramics such as lead zirconate-titanate materials are generally preferred for applications involving 50-ohm circuits and center frequencies in the range below about 6 MHz. Lithium niobate is generally preferred if the center frequencies are to be in the range above about 6 MHz.

The piezoelectric transducers employed in the present invention may be either backed with a sound-absorbing material or not, as desired. Electroacoustic converters employing backed transducers may exhibit broader bandwidth than converters with unbacked transducers, but the increase in bandwidth is generally accompanied by a decrease in conversion efficiency.

EXAMPLE

An electroacoustic converter was fabricated for use over a frequency range centered at 1.43 MHz. A thin-disc piezoelectric transducer composed of PZT-5A was employed whose thickness was selected so that its half-wave resonance frequency was 1.55 MHz. The active area defined by the electrodes of the transducer was circular with a diameter of 17.5 mm, which corresponds to 6.2 acoustic wavelengths in PZT-5A at 1.55 MHz. The transducer was cemented to a double-layer acoustic coupler with phenyl salicylate, the coupler being fabricated from discs of fused quartz and Lucite cemented together with an epoxy adhesive. The quartz and Lucite discs were 0.97 and 0.39 mm thick respectively, which corresponds to the quarter-wave lengths at 1.43 MHz in the respective materials to within 20 percent. The transducer was not backed with a sound-absorbing material, but was open to air. An inductor of about 7 μH was connected in series with the converter and the circuit was driven with a signal generator having an output impedance of 50 ohms, as shown in FIG. 3.

The two-way insertion loss of two essentially identical converters in this circuit and operating into a water load was measured for a number of frequencies, one converter being used for transmission and the other for reception. The results of the measurements are listed in Table I, the insertion losses corresponding to two converters and therefore being twice as great as for a single converter.

TABLE I

| Frequency (MHz) | Insertion Loss (dB) |
|---|---|
| 0.91 | 10 |
| 0.96 | 6 |
| 1.01 | 4 |
| 1.15 | 5 |
| 1.3 | 6 |
| 1.55 | 5.5 |
| 1.66 | 5 |
| 1.81 | 6 |
| 1.90 | 8 |
| 1.94 | 10 |

The actual insertion losses in Table I may be compared to the calculated values graphed in FIG. 4. The parameters used in the calculation did not correspond exactly to the converters actually fabricated; for example, in the calculation it was assumed that the quartz and Lucite discs were exactly one quarter-wave length thick at 1.43 MHz and that the inductor was 8 μH. Nonetheless the measured 3 dB bandwidth of about 66% is in good agreement with the calculated 3 dB bandwidth of about 75%. The measurement insertion losses are systematically about 2 dB greater than the calculated values. It is believed that a faulty electrode on the piezoelectric transducer and coupling to shear modes were the principal sources of this discrepancy.

I claim:

1. A broadband electroacoustic converter for converting between electrical signals carried on a network having a characteristic electrical impedance $R_e$ and acoustic signals carried in a load medium having a characteristic acoustic impedance $Z_a$, the signals characterized by frequencies in a range centered about a center frequency $f_o$, said electroacoustic converter comprising:

a. an electrical port through which the electrical signals may pass between the converter and the network;

b. a piezoelectric transducer comprising a thin plate of a piezoelectric material and a pair of electrodes mounted on opposing faces of the plate, the transducer having a half-wave resonance frequency $f_T$ and an active area A, the piezoelectric material being characterized by a thickness-mode electromechanical coupling constant $k_t$, a clamped dielectric constant along the thickness axis $\epsilon_t$, an acoustic phase velocity along the thickness axis $v_t$, and an acoustic impedance $Z_T$, said active area A being approximately equal to $$\frac{k_t^2 v_t}{\pi^2 \epsilon_t f_T^2 R_e}$$

said half-wave resonance frequency $f_T$ being approximately equal to $f_o$, and said coupling constant $k_t$ being greater than 0.3;

c. electrical means connecting the electrodes of the transducer to the electrical port;

d. a double-layer acoustic coupler comprising a first plate and a second plate adjoining and in acoustic contact with one another, the thickness of each plate being approximately equal to an odd-multiple of the acoustic quarter-wave length at the frequency $f_o$ in the material of which the plate is composed, the first plate being composed of a material having an acoustic impedance approximately equal to $(Z_T^3\ Z_a)^{1/4}$, the second plate being composed of a material having an acoustic impedance approximately equal to $(Z_T\ Z_a^3)^{1/4}$.

e. connecting means attaching the acoustic coupler to the piezoelectric transducer with one face of the first plate adjoining and in acoustic contact with one face of the transducer; and f. an acoustical port through which acoustical signals may pass between the converter and the load medium comprising a face of the second plate.

2. The electroacoustic converter of claim 1 in which the thickness of each plate of the acoustic coupler is approximately equal to the acoustic quarter-wave length at the frequency $f_o$ in the material of which the plate is composed.

3. The electroacoustic converter of claim 1 in which the piezoelectric material is a lead zirconate-titanate ceramic.

4. The electroacoustic converter of claim 1 in which the piezoelectric material is lithium niobate.

5. The electroacoustic converter of claim 1 in which the half-wave resonance frequency $f_T$ approximately equals 1.09 $f_o$.

6. The electroacoustic converter of claim 1 in which the first plate of the double-layer acoustic coupler is composed of fused quartz.

7. The electroacoustic converter of claim 1 in which the first plate of the double-layer acoustic coupler is composed of glass.

8. The electroacoustic converter of claim 1 in which the second plate of the double layer acoustic coupler is composed of an acrylic plastic.

9. The electroacoustic converter of claim 1 in which the electrical means connecting the electrodes of the transducer to the electrical port comprises an inductor in series with one of the electrodes.

10. A broadband electroacoustic converter for converting between electrical signals carried on a network having a characteristic electrical impedance of about 50 ohms and acoustic signals carried in a load medium having a characteristic acoustic impedance of about $1.5 \times 10^6$ kg/s m$^2$, the signals characterized by frequencies in a range centered about a center frequency $f_o$, said electroacoustic converter comprising:

a. an electrical port through which the electrical signals may pass between the converter and the network;

b. a piezoelectric transducer comprising a thin disc of piezoelectric material and a pair of conductive electrodes deposited on opposing faces of the disc, the faces being planar and substantially parallel, the electrodes being circular and defining a circular active area of the transducer, the half-wave resonance frequency $f_T$ of the transducer being approximately equal to 1.09 $f_o$, the piezoelectric material and the approximate diameter of the active area measured in acoustic wavelengths in said material at the frequency $f_T$ being selected from the group consisting of:
lithium niobate — 18 wavelengths,
PZT-4 piezoelectric ceramic — 6 wavelengths,
PZT-5A piezoelectric ceramic — 5 wavelengths,
PZT-5H piezoelectric ceramic — 4 wavelengths, and
PZT-7A piezoelectric ceramic — 9 wavelengths;

c. electrical means connecting the electrodes of the transducer to the electrical port, comprising an inductor in series with one of the electrodes;

d. a first disc composed of a first material having an acoustic impedance of about $13 \times 10^6$ kg/s m$^2$ and comprising a pair of planar faces substantially parallel to one another on opposing sides of the disc, the distance between the opposing faces being approximately equal to the acoustic quarter-wave length at the frequency $f_o$ in the first material and the diameter of the disc being approximately equal to the diameter of the active area of the transducer;

e. connecting means attaching the first disc to the piezoelectric transducer with one face of the transducer adjoining and making acoustic contact with one face of the first disc;

f. a second disc composed of a second material having an acoustic impedance of about $3 \times 10^6$ kg/s m$^2$ and comprising a pair of planar faces substantially parallel to one another on opposing sides of the disc, the distance between the opposing faces being approximately equal to the acoustic quarter-wave length at the frequency $f_o$ in the second material and the diameter of the disc being approximately equal to the diameter of the active area of the transducer;

g. connecting means attaching the second disc to the first disc with one face of the second disc adjoining and making acoustic contact with the face of the first disc opposing the face adjoining the transducer;

h. an acoustical port through which acoustical signals may pass between the converter and the load medium comprising the face of the second disc opposing the face adjoining the first disc.

11. The electroacoustic converter of claim 10 in which the first material is fused quartz.

12. The electroacoustic converter of claim 10 in which the first material is glass.

13. The electroacoustic converter of claim 10 in which the second material is an acrylic plastic.

* * * * *